(12) United States Patent
Kodera (10) Patent No.: US 7,719,822 B2
(45) Date of Patent: May 18, 2010

(54) ELECTROLYTIC CAPACITOR

(75) Inventor: Shinji Kodera, Saga (JP)

(73) Assignees: Sanyo Electric Co., Ltd., Moriguchi-shi (JP); Saga Sanyo Industries Co., Ltd., Kishima-gun (JP)

( * ) Notice: Subject to any disclaimer, the term of this patent is extended or adjusted under 35 U.S.C. 154(b) by 259 days.

(21) Appl. No.: 11/950,120

(22) Filed: Dec. 4, 2007

(65) Prior Publication Data

US 2008/0130201 A1    Jun. 5, 2008

(30) Foreign Application Priority Data

Dec. 5, 2006   (JP)   ............... 2006-327724

(51) Int. Cl.
*H01G 4/228*   (2006.01)
*H01G 9/10*   (2006.01)

(52) U.S. Cl. ..................................... 361/520

(58) Field of Classification Search .......... 361/517–520
See application file for complete search history.

(56) References Cited

U.S. PATENT DOCUMENTS 6,017,367 A * 1/2000 Nakata ....................... 29/25.03
6,898,066 B1 * 5/2005 Lin .......................... 361/301.3
7,453,683 B2 * 11/2008 Nakamura et al. ....... 361/301.3

FOREIGN PATENT DOCUMENTS

| JP | 03008013 | A | * | 1/1991 |
| JP | 03038014 | A | * | 2/1991 |
| JP | 03038015 | A | * | 2/1991 |
| JP | 03295216 | A | * | 12/1991 |
| JP | 04062817 | A | * | 2/1992 |
| JP | 05090100 | A | * | 4/1993 |
| JP | 05090101 | A | * | 4/1993 |
| JP | 05259005 | A | * | 10/1993 |
| JP | 05259008 | A | * | 10/1993 |
| JP | 2606297 | B2 |   | 2/1997 |

* cited by examiner

*Primary Examiner*—Eric Thomas
(74) *Attorney, Agent, or Firm*—Westerman, Hattori, Daniels & Adrian, LLP (57) ABSTRACT

An electrolytic capacitor includes an anode lead, a cathode lead and a seat plate. The seat plate has two grooves. The anode lead is bent along one of the grooves in the seat plate to be placed in the groove. The cathode lead is bent along the other groove in the seat plate to be placed in the groove. Accordingly, a space will be formed between the anode lead and the edges of one of the grooves in the seat plate, and likewise, between the cathode lead and the edges of the other groove in the seat plate. The anode lead and the cathode lead are mounted to a substrate with solders, and the electrolytic capacitor is mounted to the substrate. Accordingly, enhanced adhesion of the electrolytic capacitor to substrates is achieved.

12 Claims, 8 Drawing Sheets

*Fig. 14*

ELECTROLYTIC CAPACITOR

BACKGROUND OF THE INVENTION

1. Field of the Invention

The present invention relates to winding type electrolytic capacitors.

2. Related Art

Following the recent demand for electrical circuits that are smaller in size and adapted for high-frequency, capacitors with lower impedance have been required. In particular, absorption of high-frequency noise and ripple current is required in designing driving circuits for CPUs (Central Processing Units) of computers, switching power circuits and the like, and therefore, capacitors with low ESR (Equivalent Series Resistance) have become necessary.

Winding type electrolytic capacitors have been attracting attention as their ESR can be made lower. Japanese Patent No. 2606297 discloses a well-known electrolytic capacitor with high capacitance. This electrolytic capacitor includes an anode foil, a cathode foil and a separator sheet placed therebetween, which are rolled up together.

BRIEF SUMMARY OF THE INVENTION

With conventional electrolytic capacitors, the electrode terminals are placed in the grooves in the surface of the seat plate. The width of the grooves, however, is the substantially same as that of the electrode terminals. Therefore, in mounting the electrolytic capacitors to a substrate, solders for soldering the electrode terminals to the substrate flows away along the surface of the substrate from the electrode terminals. Thus, there has been a problem that adhesion between the electrode terminals and the substrate is decreased.

The invention is intended to solve the aforementioned problem, and one object of the invention is to provide an electrolytic capacitor with enhanced adhesion to substrates.

According to the invention, an electrolytic capacitor includes a capacitor element, an anode lead, a cathode lead, and a seat plate. The capacitor element is formed by rolling up an anode member and a cathode member together with a separator sheet placed therebetween. The anode lead is electrically connected to the anode member. The cathode lead is electrically connected to the cathode member. The seat plate includes a first through-hole through which the anode lead runs, a second through-hole through which the cathode lead runs, a first groove provided around the first through-hole, and a second groove provided around the second through-hole.

Preferably, the anode lead bent along the seat plate is placed along the first groove, and the cathode lead bent along the seat plate is placed along the second groove.

Preferably, the first groove includes a first wide portion and a first narrow portion. The first wide portion is provided around the first through-hole. The distance from the edges of the first wide portion to the first through-hole is larger than the width of the anode lead. The first narrow portion has the substantially same width as that of the anode lead. The second groove includes a second wide portion and a second narrow portion. The second wide portion is provided around the second through-hole. The distance from the edges of the second wide portion to the second through-hole is larger than the width of the cathode lead. The second narrow portion has the substantially same width as that of the bent cathode lead.

Preferably, the first and the second wide portion are substantially circular.

Preferably, the first and the second wide portion are substantially square.

Preferably, the first and the second grooves form a combined groove.

The electrolytic capacitor according to the invention includes a seat plate having the first groove provided around the first through-hole through which the anode lead runs and the second groove provided around the second through-hole through which the cathode lead runs. Therefore, when the anode lead is placed along the first groove and the cathode lead is placed along the second groove, a space will be formed around the first and the second through-holes. Accordingly, in mounting the electrolytic capacitor to a substrate, solders used to connect the electrolytic capacitor to the substrate stays in the space formed around the first and the second through-holes, that is, around the anode lead and the cathode lead. The solders staying around the anode lead and the cathode lead contribute to the adhesion of the anode lead and the cathode lead to the substrate.

Thus, the invention allows for enhanced adhesion between an electrolytic capacitor and a substrate.

DETAILED DESCRIPTION OF THE INVENTION

Embodiments of the present invention will be described in detail with reference to the figures. In the figures, identical or corresponding components are denoted by the same reference characters and description thereof will not be repeated.

Embodiment 1

Figure 1:
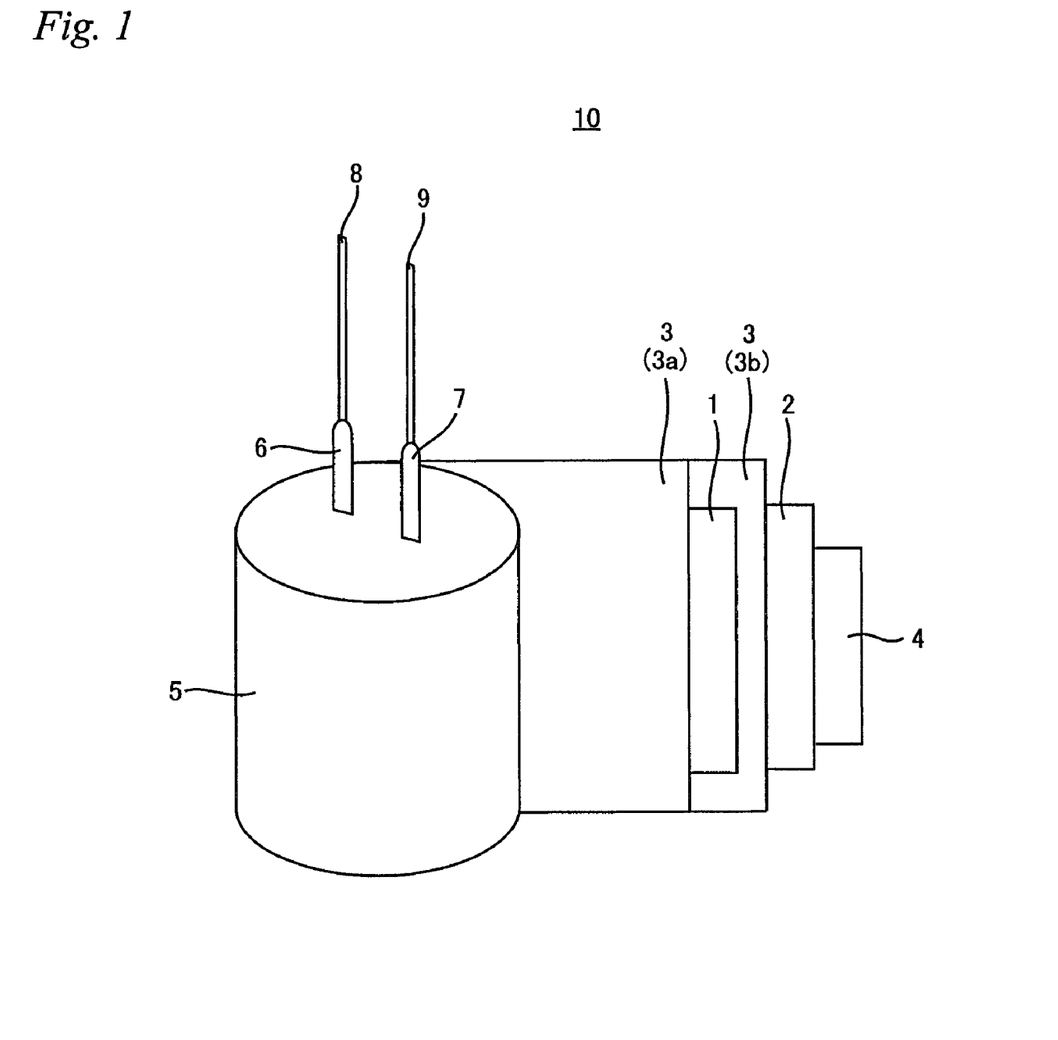
FIG. 1 is a perspective view illustrating the structure of an electrolytic capacitor accordingly to Embodiment 1 of the invention.
Figure 2:
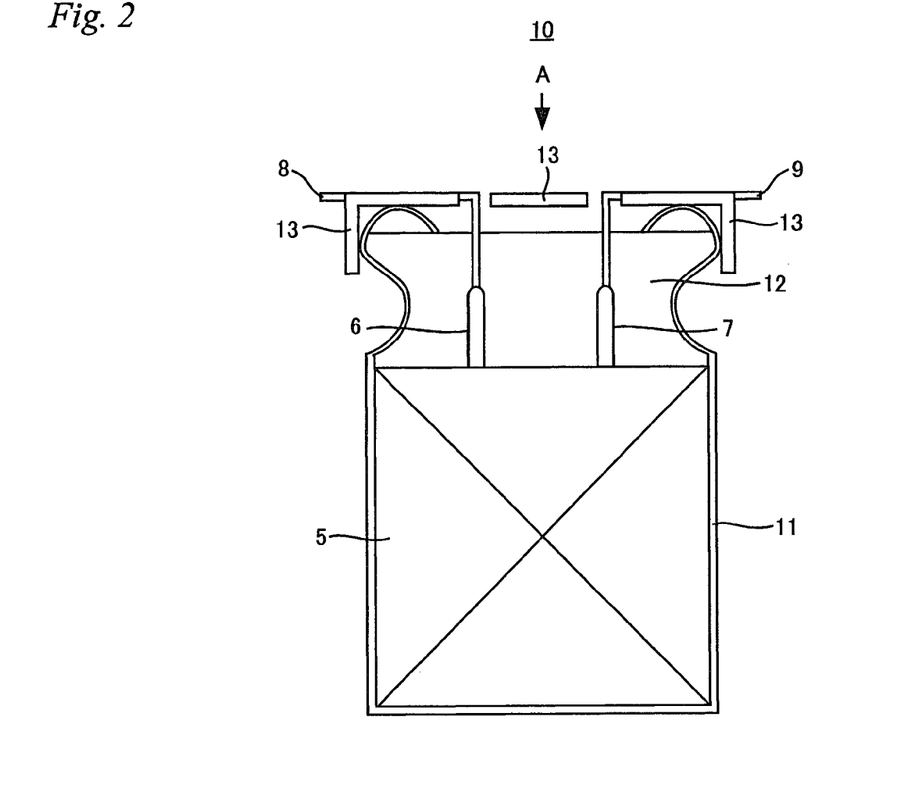
FIG. 2 is a cross sectional view of the electrolytic capacitor according to Embodiment 1 of the invention.

FIG. 1 is a perspective view illustrating the structure of an electrolytic capacitor accordingly to Embodiment 1 of the invention. FIG. 2 is a cross sectional view of the electrolytic capacitor according to Embodiment 1 of the invention. With reference to FIGS. 1 and 2, an electrolytic capacitor 10 according to Embodiment 1 of the invention includes an oxidized anode foil 1, a cathode foil 2, a separator sheet 3, a securing tape 4, lead tab terminals 6 and 7, an anode lead 8, a cathode lead 9, a case 11, a sealing rubber packing 12, and a seat plate 13.

The electrolytic capacitor 10 includes solid electrolyte, for example.

The oxidized anode foil 1 is formed of aluminum foil the surface of which has been etched and processed by chemical conversion treatment. Therefore, the surface of the oxidized anode foil 1 becomes rough and has an oxide layer thereon. The cathode foil 2 is formed of aluminum foil.

The oxidized anode foil 1 and the cathode foil 2 are placed together having the separator sheet 3 therebetween and then rolled up. After that, the end of the rolled stack of the oxidized anode foil 1, the cathode foil 2 and the separator sheet 3 is sealed up with the securing tape 4. In this manner, a capacitor element 5 that is substantially cylindrical is formed.

The lead tab terminal 6 is connected to the oxidized anode foil 1, and the lead tab terminal 7 is connected to the cathode foil 2. The anode lead 8 is connected to the lead tab terminal 6, and the cathode lead 9 is connected to the lead tab terminal 7.

The case 11 is made of aluminum and houses the capacitor element 5, the lead tab terminals 6 and 7, the anode lead 8, and the cathode lead 9. The sealing rubber packing 12 seals up the capacitor element 5 and the lead tab terminals 6 and 7 into the case 11. The seat plate 13 fixes the anode lead 8 and the cathode lead 9. The anode lead 8 and the cathode lead 9 are bent along the seat plate 13 when the capacitor element 5 is placed in the case 11.

Figure 3:
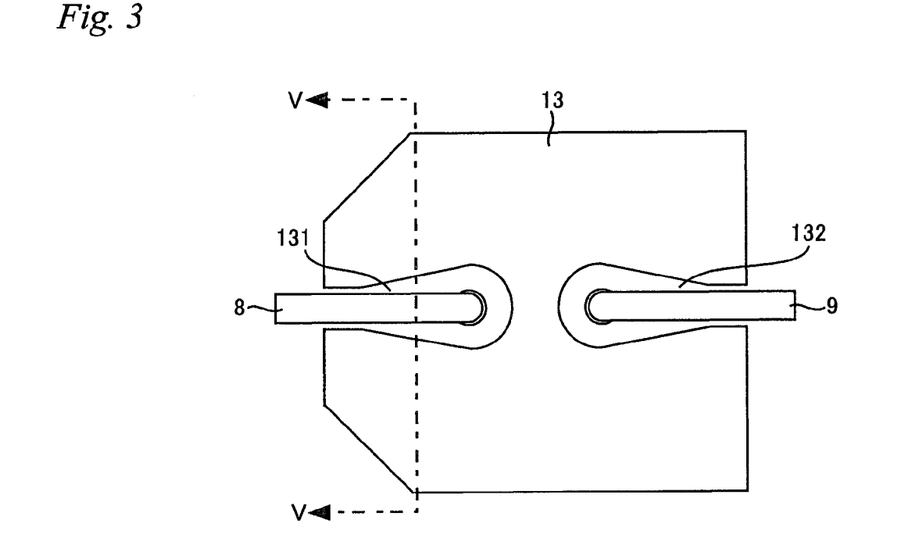
FIG. 3 is a plan view of the electrolytic capacitor viewed along A direction shown in FIG. 2.

FIG. 3 is a plan view of the electrolytic capacitor 10 viewed along A direction shown in FIG. 2. With reference to FIG. 3, the seat plate 13 is substantially rectangular and has grooves 131 and 132. The anode lead 8 and the cathode lead 9 are bent along the surface of the seat plate 13 to fit into the grooves 131 and 132, respectively.

The bent anode lead 8 and cathode lead 9 are used as terminals of the electrolytic capacitor 10.

Figure 4:
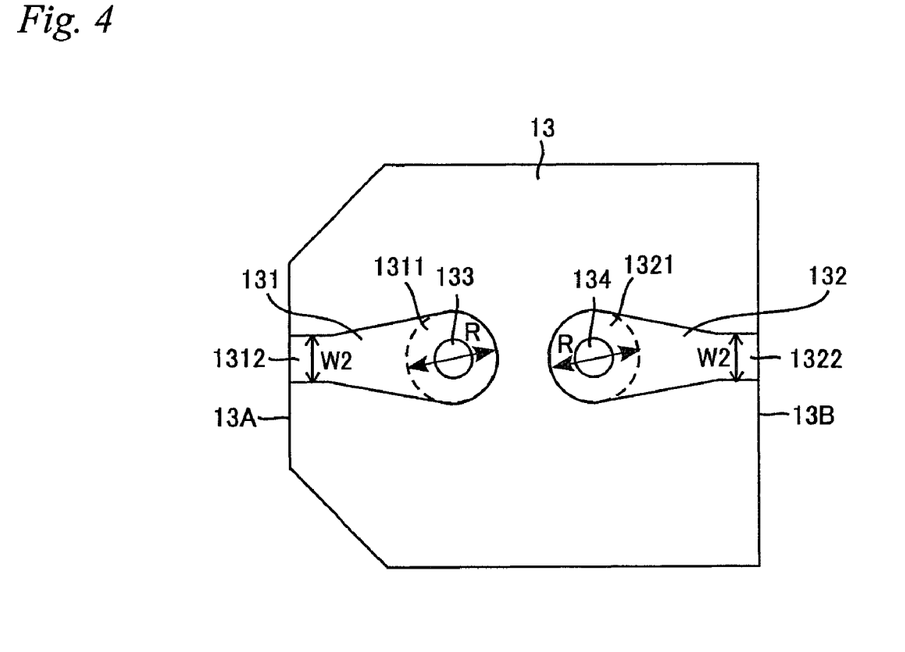
FIG. 4 is a plan view of the seat plate viewed along A direction shown in FIG. 2.

FIG. 4 is a plan view of the seat plate 13 viewed along A direction shown in FIG. 2. With reference to FIG. 4, the seat plate 13 has through-holes 133 and 134. The through-hole 133 is to pass the anode lead 8 therethrough, and the through-hole 134 is to pass the cathode lead 9 therethrough.

The groove 131 is formed in the surface of the seat plate 13 toward one end 13A of the seat plate 13 and surrounds the through-hole 133. The groove 131 has a wide portion 1311 and a narrow portion 1312. The wide portion 1311 is substantially circular and has a diameter R. The diameter R is set to be equal to or larger than 2×W1 while the width of the anode lead 8 and the cathode lead 9 is set to be W1. The narrow portion 1312 has a width W2 that is the substantially same as the width W1. Accordingly, heading from the wide portion 1311, the groove 131 gradually tapers from R to W2 toward the narrow portion 1312.

The groove 132 is formed in the surface of the seat plate 13 toward the other end 13B of the seat plate 13 and surrounds the through-hole 134. The groove 132 has a wide portion 1321 and a narrow portion 1322. The wide portion 1321 is substantially circular and has a diameter R. The narrow portion 1322 has a width W2. Accordingly, heading from the wide portion 1321, the groove 132 gradually tapers from R to W2 toward the narrow portion 1322.

The anode lead 8 runs through the through-hole 133 and then is bent along the groove 131 to be placed in the groove 131. The narrow portion 1312 of the groove 131 positions the anode lead 8.

The cathode lead 9 runs through the through-hole 134 and then is bent along the groove 132 to be placed in the groove 132. The narrow portion 1322 of the groove 132 positions the cathode lead 9.

Figure 5:
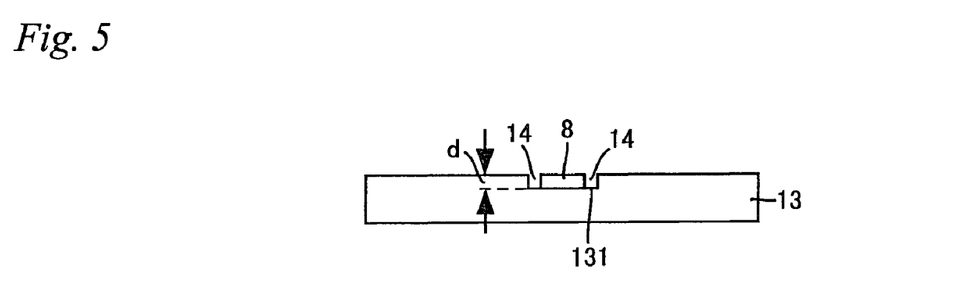
FIG. 5 is a cross sectional view of the anode lead and the seat plate viewed along line V-V shown in FIG. 3.

FIG. 5 is a cross sectional view of the anode lead 8 and the seat plate 13 viewed along line V-V shown in FIG. 3. With reference to FIG. 5, the groove 131 of the seat plate 13 has a depth d, which is set to 0.23 mm, for example. The anode lead 8 has a thickness that is substantially equal to the depth d, and therefore, fits in the groove 131. Accordingly, a space 14 will be formed between the anode lead 8 and the edges of the groove 131 in the seat plate 13.

When the cathode lead 9 is bent along the groove 132, as illustrated with the anode lead 8 in FIG. 5, a space 14 is formed between the cathode lead 9 and the edges of the groove 132 in the seat plate 13.

Figure 6A:
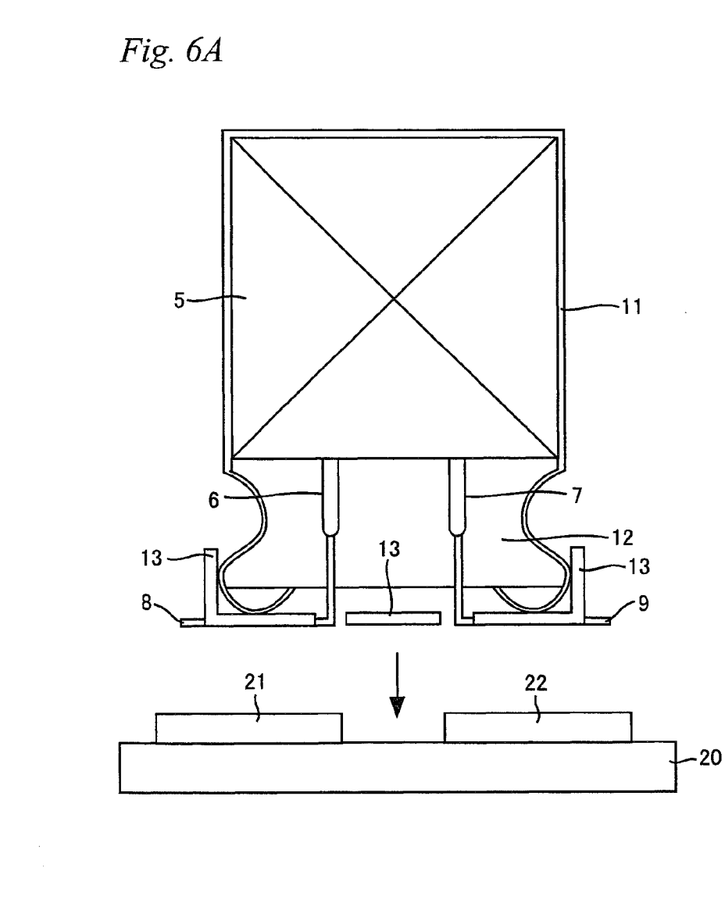
FIGS. 6A and 6B are for use in illustrating how to mount the electrolytic capacitor shown in FIGS. 1 and 2 to a substrate.
Figure 6B:
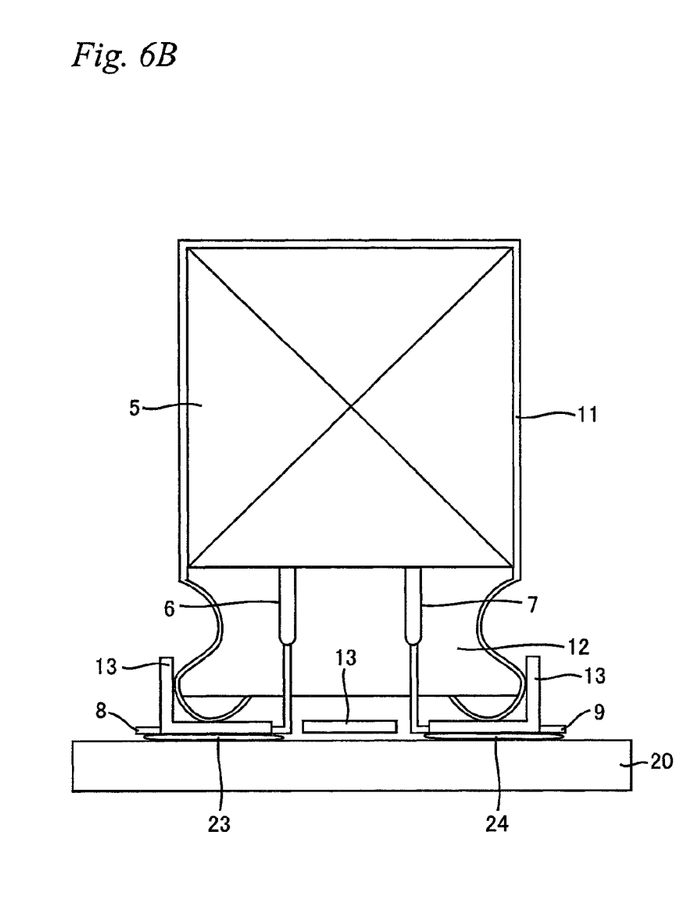

FIGS. 6A and 6B are for use in illustrating how to mount the electrolytic capacitor 10 shown in FIGS. 1 and 2 to a substrate. With reference to FIG. 6A, in mounting the electrolytic capacitor 10 to a substrate 20, solders 21 and 22 are applied onto the substrate 20. In this case, the electrolytic capacitor 10 is placed on the substrate 20 so that the seat plate 13 makes contact with the substrate 20. The solders 21 and 22 are applied so as to face the anode lead 8 and the cathode lead 9, respectively (see FIG. 6A).

When the solders 21 and 22 on the substrate 20 melts, the electrolytic capacitor 10 is placed on the substrate 20 so that the anode lead 8 and the cathode lead 9 respectively make contact with the melted solders 21 and 22. The anode lead 8 is connected to the substrate 20 with the solder 23, and the cathode lead 9 is connected to the substrate 20 with the solder 24 (see FIG. 6B). In this manner, the electrolytic capacitor 10 is mounted to the substrate 20.

Figure 7:
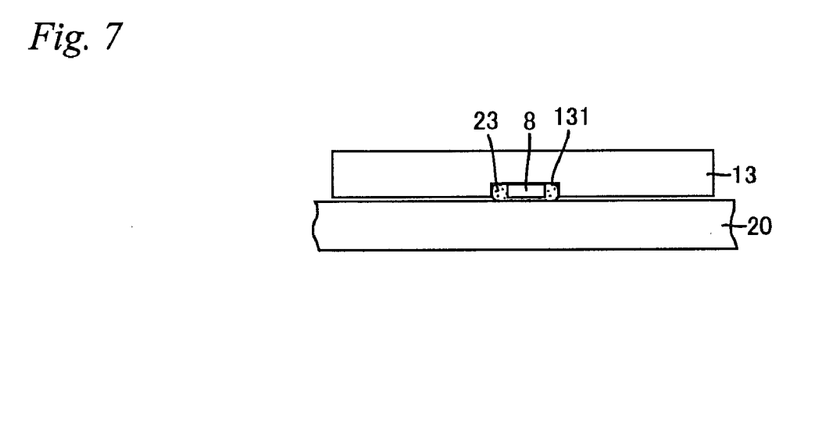
FIG. 7 is a cross sectional view around the anode lead when the electrolytic capacitor is mounted to a substrate.

FIG. 7 is a cross sectional view around the anode lead 8 when the electrolytic capacitor 10 is mounted to the substrate 20. With reference to FIG. 7, when the anode lead 8 is connected to the substrate 20 with the solder 23, the solder 23 is present not only in a space between the anode lead 8 and the substrate 20, but also in the space 14 between the anode lead 8 and the edges of the groove 131 in the seat plate 13. More specifically, the solder 23 stays in the groove 131 in the seat plate 13 and does not flow out of the groove 131. Likewise, the cross sectional view around the cathode lead 9 obtained when the electrolytic capacitor 10 is mounted to the substrate 20 is identical with the cross sectional view shown in FIG. 7, and thus, the solder 24 stays in the groove 132 in the seat plate 13 and does not flow out of the groove 132.

Accordingly, by providing the seat plate 13 with the grooves 131 and 132, solders used to mount the electrolytic capacitor 10 to the substrate 20 are kept around the anode lead 8 and the cathode lead 9. As a result, the adhesion between the substrate 20 and the anode lead 8 and the cathode lead 9 is enhanced.

Figure 8:
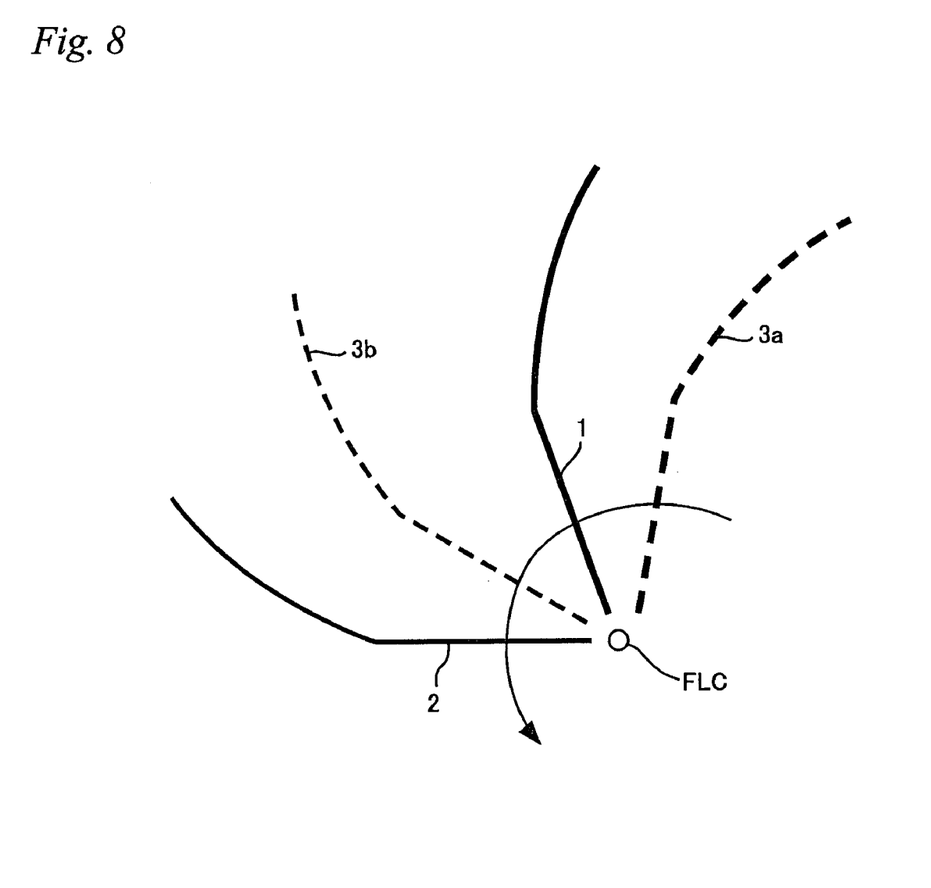
FIG. 8 illustrates how the oxidized anode foil, the cathode foil and the separator sheets are rolled up.

FIG. 8 illustrates how the oxidized anode foil 1, the cathode foil 2 and the separator sheets 3 (3a and 3b) are rolled up. How to fabricate the electrolytic capacitor 10 shown in FIGS. 1 and 2 is now explained. In fabricating the electrolytic capacitor 10, the surface of aluminum foil is etched, processed by chemical conversion treatment, and cut into a certain size (of length L and width W) to form a sheet of oxidized anode foil 1. A sheet of cathode foil 2 is obtained by cutting aluminum foil into a certain size (of length L and width W).

The oxidized anode foil 1, the cathode foil 2 and the two separator sheets 3a and 3b are placed together as illustrated in FIG. 8. Then, the oxidized anode foil 1, the cathode foil 2 and the two separator sheets 3a and 3b are wound counterclockwise (or clockwise) so as to pivot around a pivot point FLC to be rolled up. The end of the rolled stack of the oxidized anode foil 1, the cathode foil 2, and the separator sheets 3a and 3b is sealed up with the securing tape 4. In this way, the capacitor element 5 is obtained.

After that, the capacitor element 5 is processed by chemical conversion treatment and, then, impregnated with mixed solution of 3,4-ethylenedioxythiophene that forms conductive polymer by polymerization and ferric p-toluenesulfonic acid alcohol solution as oxidation solution. By impregnated with this mixed solution, a conductive polymer layer as electrolyte is formed.

Then, the sealing rubber packing 12 is inserted into the capacitor element 5. The capacitor element 5 into which the sealing rubber packing 12 is inserted is housed in the case 11. The opening of the case 11 is pressed and curled to seal the capacitor element 5 in the case 11.

Then, the capacitor element 5 is aged. By passing the anode lead 8 and the cathode lead 9 through the through-holes 133 and 134, respectively, the seat plate 13 that is made of plastic is inserted onto the curled open end of the case 11. Then, the anode lead 8 and the cathode lead 9 are pressed for use as electrode terminals and bent along the grooves 131 and 132, respectively, in the seat plate 13 to form electrodes. In this manner, the electrolytic capacitor 10 is obtained.

Upon completion of fabricating the electrolytic capacitor 10, the electrolytic capacitor 10 is mounted to the substrate 20 in the above described manner. In this way, in mounting the electrolytic capacitor 10 to the substrate 20, the adhesion between the electrolytic capacitor 10 and the substrate 20 is enhanced.

As described above, the electrolytic capacitor 10 has the seat plate 13 having the grooves 131 and 132 for keeping solders, which are used to mount the electrolytic capacitor 10 to the substrate 20, around the anode lead 8 and the cathode lead 9. Therefore, the adhesion between the electrolytic capacitor 10 and the substrate 20 is enhanced.

Embodiment 2

Figure 9:
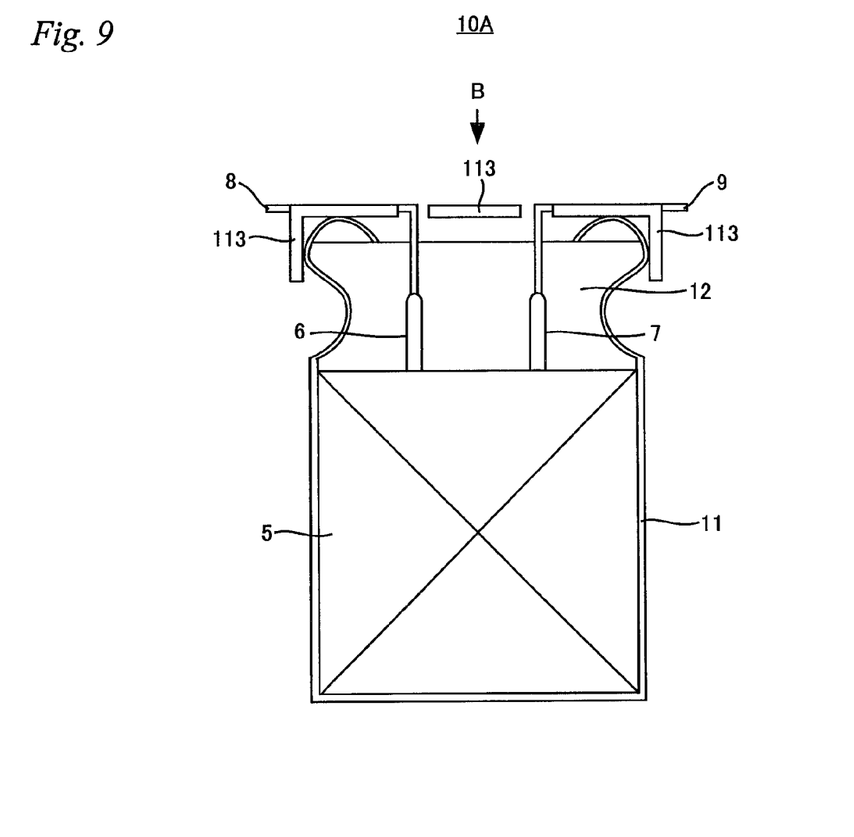
FIG. 9 is a cross sectional view illustrating the structure of an electrolytic capacitor according to Embodiment 2.

FIG. 9 is a cross sectional view illustrating the structure of an electrolytic capacitor according to Embodiment 2. With reference to FIG. 9, the electrolytic capacitor 10A according to Embodiment 2 is identical with the electrolytic capacitor 10 shown in FIG. 2 except that the seat plate 13 is replaced with a seat plate 113.

The anode lead 8 runs through the through-hole in the seat plate 113 and then is bent along one of the grooves in the seat plate 113. The cathode lead 9 runs through the through-hole in the seat plate 113 and then is bent along the other groove in the seat plate 113.

Figure 10:
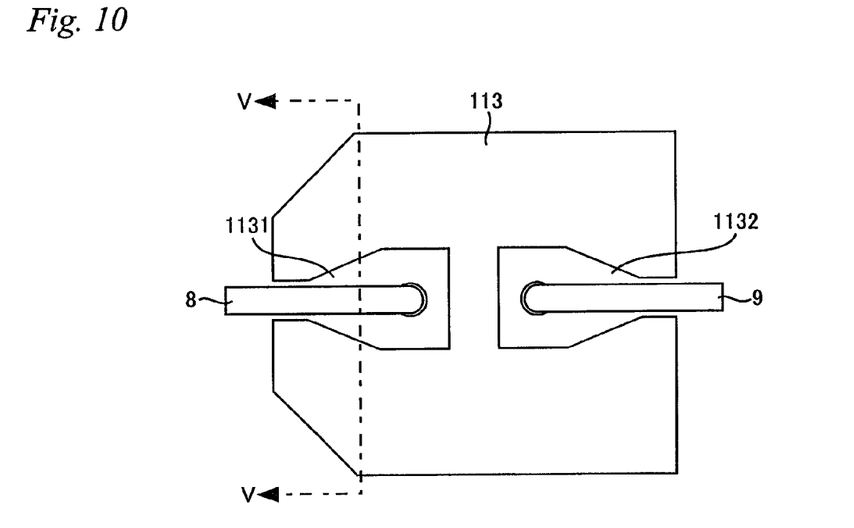
FIG. 10 is a plan view of the electrolytic capacitor viewed along B direction shown in FIG. 9.

FIG. 10 is a plan view of the electrolytic capacitor 10A viewed along B direction shown in FIG. 9. With reference to FIG. 10, the seat plate 113 is substantially rectangular and has grooves 1131 and 1132. The anode lead 8 and the cathode lead 9 are each bent along the surface of the seat plate 113 so as to fit in the grooves 1131 and 1132 in the seat plate 113, respectively.

The bent anode lead 8 and cathode lead 9 is used as terminals of the electrolytic capacitor 10A.

It should be note that the cross sectional view of the anode lead 8 and the seat plate 113 viewed along line V-V is identical with the cross sectional view shown in FIG. 5.

Figure 11:
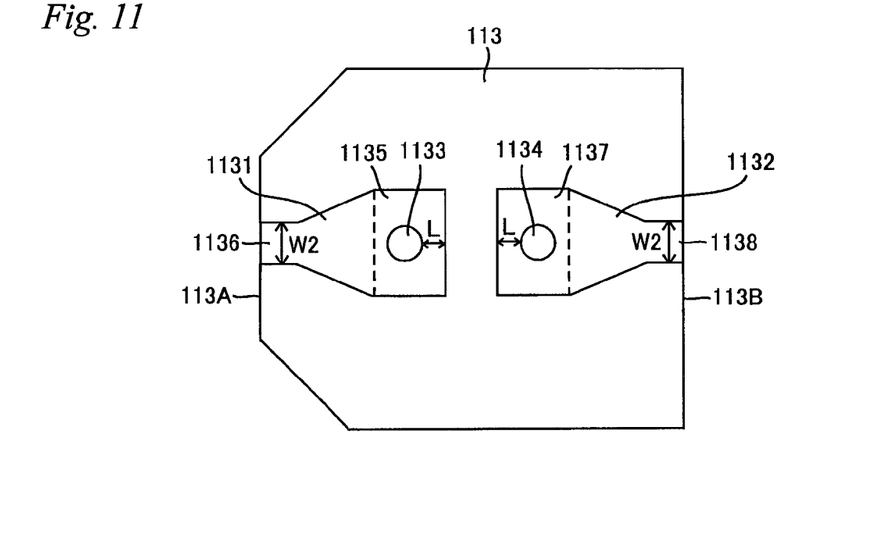
FIG. 11 is a plan view of the seat plate viewed along B direction shown in FIG. 9.

FIG. 11 is a plan view of the seat plate 113 viewed along B direction shown in FIG. 9. With reference to FIG. 11, the seat plate 113 has through-holes 1133 and 1134. The through-hole 1133 is to pass the anode lead 8, and the through-hole 1134 is to pass the cathode lead 9.

The groove 1131 is formed in the surface of the seat plate 113 toward one end 113A of the seat plate 113 and surrounds the through-hole 1133. The groove 1131 has a wide portion 1135 and a narrow portion 1136. The wide portion 1135 is substantially square. The distance L between one of the edges of the wide portion 1135 and the through-hole 1133 is set to be equal to or larger than 2×W1 while the width of the anode lead 8 is set to W1. The narrow portion 1136 has a width W2 that is substantially equal to the width W1. Thus, heading from the wide portion 1135, the groove 1131 tapers toward the narrow portion 1136.

The groove 1132 is formed in the surface of the seat plate 113 toward the other end 113B of the seat plate 113 and surrounds the through-hole 1134. The groove 1132 has a wide portion 1137 and the narrow portion 1138. The wide portion 1137 is substantially square. The distance L between one of the edges of the wide portion 1137 and the through-hole 1134 is set to be equal to or larger than 2×W1 while the width of the cathode lead 9 is set to W1. The narrow portion 1138 has a width W2 that is substantially equal to the width W1. Accordingly, heading from the wide portion 1137, the groove 1132 gradually tapers toward the narrow portion 1138.

The anode lead 8 runs through the through-hole 1133 and then is bent along the groove 1131 to be placed in the groove 1131. The narrow portion 1136 of the groove 1131 positions the anode lead 8.

The cathode lead 9 runs through the through-hole 1134 and then is bent along the groove 1132 to be placed in the groove 1132. The narrow portion 1138 of the groove 1132 positions the cathode lead 9.

FIG. 11 illustrates only in the horizontal direction the distance between the edge of the groove 1131 and the through-hole 1133 and the distance between the edge of the groove 1132 and the through-hole 1134, however, the distance between the edge of the groove 1131 and the through-hole 1133 and the distance between the edge of the groove 1132 and the through-hole 1134 in the vertical direction are also set to be L.

The electrolytic capacitor 10A is obtained in the same manner as the electrolytic capacitor 10 and mounted to the substrate 20 in the same manner as the electrolytic capacitor 10 as is illustrated in FIG. 6. In this case, the cross sectional views around the anode lead 8 and the cathode lead 9 are identical with the cross sectional view shown in FIG. 7, and thus, the solder 23 is present not only in the space between the anode lead 8 and the substrate 20, but also in the space between the anode lead 8 and the edges of the groove 1131 in the seat plate 113. More specifically, the solder 23 stays in the groove 1131 in the seat plate 113 and does not flow out of the groove 1131. Likewise, the solder 24 is present not only in the space between the cathode lead 9 and the substrate 20, but also in the space between the cathode lead 9 and the edges of the groove 1132 in the seat plate 113. That is, the solder 24 stays in the groove 1132 in the seat plate 113 and does not flow out of the groove 1132.

Accordingly, by providing the seat plate 113 with the grooves 1131 and 1132, solders used to mount the electrolytic capacitor 10A to the substrate 20 are kept around the anode lead 8 and the cathode lead 9. As a result, the adhesion between the substrate 20 and the anode lead 8 and the cathode lead 9 of the electrolytic capacitor 10A is enhanced.

The rest is the same as the Embodiment 1.

Embodiment 3

Figure 12:
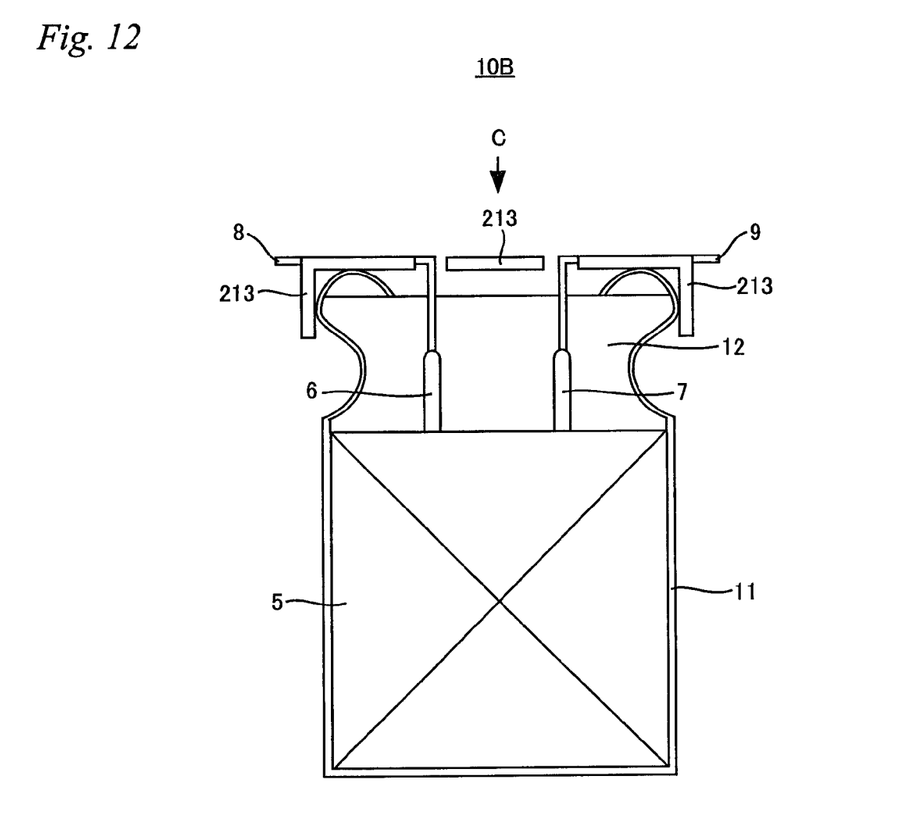
FIG. 12 is a cross sectional view illustrating the structure of an electrolytic capacitor according to Embodiment 3.

FIG. 12 is a cross sectional view illustrating the structure of an electrolytic capacitor according to Embodiment 3. With reference to FIG. 12, the electrolytic capacitor 10B according to Embodiment 3 is identical with the electrolytic capacitor 10 shown in FIG. 2 except that the seat plate 13 is replaced with a seat plate 213.

The anode lead 8 runs through the through-hole in the seat plate 213 and then is bent along one of the grooves in seat plate 213. The cathode lead 9 runs through the through-hole in the seat plate 213 and then is bent along the other groove in the seat plate 213.

Figure 13:
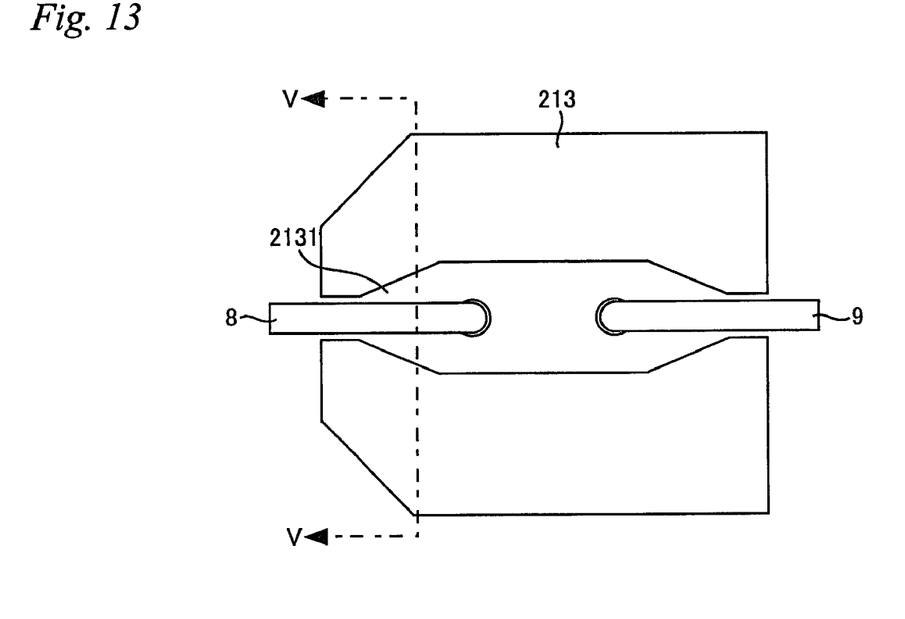
FIG. 13 is a plan view of the electrolytic capacitor viewed along C direction shown in FIG. 12.

FIG. 13 is a plan view of the electrolytic capacitor 10B viewed along C direction shown in FIG. 12. With reference to FIG. 13, the seat plate 213 is substantially rectangular and has a groove 2131. The anode lead 8 and the cathode lead 9 are each bent along the surface of the seat plate 213 so as to fit in the groove 2131 in the seat plate 213.

The bent anode lead 8 and cathode lead 9 are used as terminals of the electrolytic capacitor 10B.

It should be noted that the cross sectional views of the anode lead 8 and the seat plate 113 viewed along line V-V are identical with the cross sectional view shown in FIG. 5.

Figure 14:
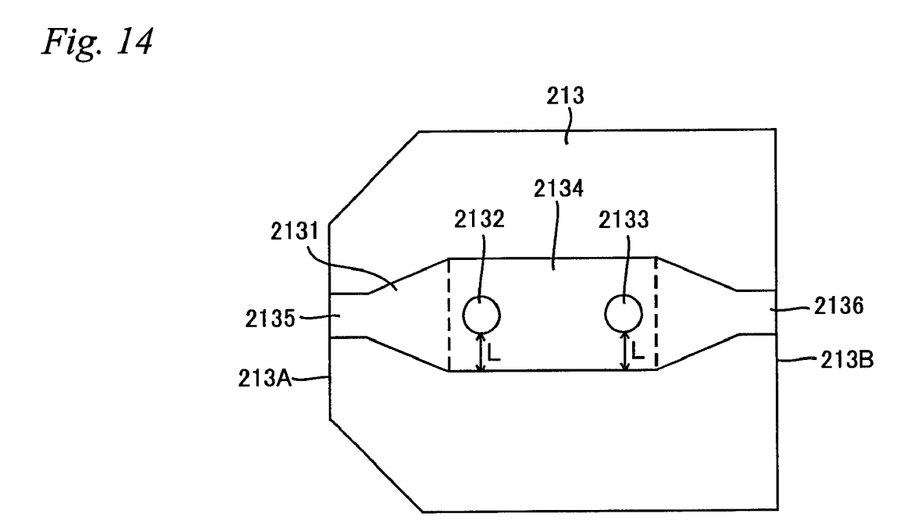
FIG. 14 is a plan view of the seat plate viewed along C direction shown in FIG. 12.

FIG. 14 is a plan view of the seat plate 213 viewed along C direction shown in FIG. 12. With reference to FIG. 14, the seat plate 213 has through-holes 2132 and 2133. The through-hole 2132 is to pass the anode lead 8, and the through-hole 2133 is to pass the cathode lead 9.

The groove 2131 is formed in the surface of the seat plate 213 from one end 213A toward the other end 213B of the seat plate 213 and surrounds the through-holes 2132 and 2133. The groove 2131 has a wide portion 2134 and narrow portions 2135 and 2136. The wide portion 2134 is substantially square. The distance between the edges of the wide portion 2134 and the through-holes 2132 and 2133 is set to be L. The narrow portions 2135 and 2136 have a width W2 that is substantially equal to the width W1. Accordingly, heading from the wide portion 2134, the groove 2131 gradually tapers toward the narrow portions 2135 and 2136.

The anode lead 8 runs through the through-hole 2132 and then is bent along the groove 2131 to be placed in the groove 2131. The narrow portion 2135 of the groove 2131 positions the anode lead 8.

The cathode lead 9 runs through the through-hole 2133 and then is bent along the groove 2131 to be placed in the groove 2131. The narrow portion 2136 of the groove 2131 positions the cathode lead 9.

The electrolytic capacitor 10B is fabricated in the same manner as the electrolytic capacitor 10 and mounted to the substrate 20 in the same manner as the electrolytic capacitor 10 as is illustrated in FIG. 6. In this case, the cross sectional views around the anode lead 8 and the cathode lead 9 are identical with the cross sectional view shown in FIG. 7. Thus, the solder 23 is present not only in the space between the anode lead 8 and the substrate 20, but also in the space between the anode lead 8 and the edges of the groove 2131 in the seat plate 213. That is, the solder 23 stays in the groove 2131 in the seat plate 213 and does not flow out of the groove 2131. The solder 24 is present not only in the space between the cathode lead 9 and the substrate 20, but also in the space between the cathode lead 9 and the edges of the groove 2131 in the seat plate 213. That is, the solder 24 stays in the groove 2131 in the seat plate 213 and does not flow out of the groove 2131.

Accordingly, by providing the seat plate 213 with the groove 2131, solders used to mount the electrolytic capacitor 10B to the substrate 20 are kept around the anode lead 8 and the cathode lead 9. As a result, the adhesion between the substrate 20 and the anode lead 8 and the cathode lead 9 of the electrolytic capacitor 10B is promoted.

The table 1 shows the sticking rate of the solders to the seat plate around the through-holes to pass the leads, other than the grooved part, obtained when the electrolytic capacitors 10, 10A and 10B according to Embodiments 1 to 3 are mounted to the substrate 20.

TABLE 1

|  | The sticking rate of the solders to the surface of the seat plate other than the grooved part (units) |
| --- | --- |
| Embodiment 1 | 0/30 (0%) |
| Embodiment 2 | 0/30 (0%) |
| Embodiment 3 | 0/30 (0%) |
| Conventional Electrolytic Capacitors | 30/30 (100%) |

For the sake of comparison, Table 1 also shows the sticking rate of the solders to the seat plate around the through-holes to pass the leads, other than the grooved part, obtained when conventional electrolytic capacitors are mounted to the substrate 20. The solders were reflowed once for 60 seconds at 220° C. with a peak temperature of 250° C. The solders had a thickness of 150 μm, and the electrolytic capacitors had a diameter of 10 mm and a height of 8 mm.

According to the rates shown in Table 1, the sticking rate of the solders to the seat plate around the through-holes is 0% when the electrolytic capacitors 10, 10A, and 10B according to the invention are mounted to the substrate 20 whereas the sticking rate of the solders to the seat plate around the through-holes when conventional electrolytic capacitors are mounted to the substrate is 100%.

Thus, by fabricating the electrolytic capacitors 10, 10A, 10B with the seat plates 13, 113, and 213, solders used to mount the electrolytic capacitors 10, 10A, and 10B to a substrate are kept in the grooves 131 and 132, 1131 and 1132, and 2131 in the seat plates 13, 113 and 213. Therefore, through this experiment, enhanced adhesion between the substrate 20 and the electrolytic capacitor 10, 10A and 10B has been confirmed.

The rest is the same as Embodiment 1.

The present invention may include a seat plate having grooves of a shape other than the shapes of the above-described grooves 131 and 132, 1131 and 1132, and 2131 according to Embodiment 1 to Embodiment 3. More specifically, if the grooves in the seat plate surround the through-holes to pass the anode lead 8 and the cathode lead 9, the grooves may be of any shape.

Each of the through-holes 133, 1133 and 2132 forms the first through-hole, and each of the through-holes 134, 1134 and 2133 forms the second through-hole.

Each of the grooves 131 and 1131 forms the first groove, and each of the grooves 132 and 1132 forms the second groove. The groove 2131 forms a combined groove.

The wide portions 1311, 1135 and 2134 each form the first wide portion, and the wide portion 1321, 1137 and 2134 each form the second wide portion.

The narrow portions 1312, 1136 and 2135 each form the first narrow portion, and the narrow portions 1322, 1138 and 2136 each form the second narrow portion.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An electrolytic capacitor comprising:
   a capacitor element formed of a rolled stack of an anode member, a cathode member and a separator sheet placed therebetween;
   an anode lead electrically connected to the anode member;
   a cathode lead electrically connected to the cathode member; and
   a seat plate having a first through-hole to pass the anode lead, a second through-hole to pass the cathode lead, a first groove provided around the first through-hole, and a second groove provided around the second through-hole,
   wherein the anode lead bent along the seat plate is placed along the first groove,
   the cathode lead bent along the seat plate is placed along the second groove,
   wherein the first groove includes
      a first wide portion having a width wider than the width of the anode lead around the first through-hole, and
      a first narrow portion having a width substantially equal to the width of the anode lead at one end of the seat plate, and
   the second groove includes
      a second wide portion having a width wider than the width of the cathode lead around the second through-hole, and
      a second narrow portion having a width substantially equal to the width of the cathode lead at the other end of the seat plate,
   wherein the first narrow portion has a same width over constant length, and
   the second narrow portion has a same width over constant length.

2. The electrolytic capacitor according to claim 1, wherein the first and the second grooves form a combined groove.

3. The electrolytic capacitor according to claim 1, wherein the first and the second wide portions are substantially circular.

4. The electrolytic capacitor according to claim 3, wherein the first and the second grooves form a combined groove.

5. The electrolytic capacitor according to claim 1, wherein the first and the second wide portions are substantially square.

6. The electrolytic capacitor according to claim 5, wherein the first and the second grooves form a combined groove.

7. An electrolytic capacitor comprising:
   a capacitor element formed of a rolled stack of an anode member, a cathode member and a separator sheet placed therebetween;
   an anode lead electrically connected to the anode member;
   a cathode lead electrically connected to the cathode member; and
   a seat plate having a first through-hole to pass the anode lead, a second through-hole to pass the cathode lead, a first groove provided around the first through-hole, and a second groove provided around the second though-hole; wherein
   the anode lead bent along the seat plate is placed along the first groove;
   the cathode lead bent along the seat plate is placed along the second groove;
   the first groove includes
      a first wide portion having a width wider than the width of the anode lead around the first through-hole, and
      a first narrow portion having a width substantially equal to the width of the anode lead at one end of the seat plate, and
   the second groove includes
      a second wide portion having a width wider than the width of the cathode lead around the second through-hole, and
      a second narrow portion having a width substantially equal to the width of the cathode lead at the other end of the seat plate,
   wherein each of the first and the second wide portions has a width equal to or larger than twice the width of the anode lead.

8. The electrolytic capacitor according to claim 7, wherein the first and the second grooves form a combined groove.

9. The electrolytic capacitor according to claim 7, wherein the first and the second wide portions are substantially circular.

10. The electrolytic capacitor according to claim 9, wherein the first and the second grooves form a combined groove.

11. The electrolytic capacitor according to claim 7, wherein the first and the second wide portions are substantially square.

12. The electrolytic capacitor according to claim 11, wherein the first and the second grooves form a combined groove.

* * * * *